United States Patent [19]
Whitaker

[11] Patent Number: 4,999,947
[45] Date of Patent: Mar. 19, 1991

[54] CONTROLLED WICK WATERER FOR PLANTER POTS AND THE LIKE

[76] Inventor: Dale Whitaker, 16341 Ladysmith St., Hacienda Heights, Calif. 91745

[21] Appl. No.: 415,996

[22] Filed: Oct. 2, 1989

[51] Int. Cl.⁵ ............................................... A01G 27/00
[52] U.S. Cl. ........................................................ 47/81
[58] Field of Search ..................... 126/45, 46, 47, 48; 47/79, 81, 48.5; 122/366; 431/102; 222/187

[56] References Cited

U.S. PATENT DOCUMENTS

| | | | |
|---|---|---|---|
| 897,131 | 8/1908 | Owen | 47/81 X |
| 3,261,125 | 7/1966 | Akebauer | 47/81 |
| 3,758,987 | 9/1973 | Crane, Jr. | 220/13 |
| 4,324,070 | 4/1982 | Swisher | 42/81 |
| 4,343,109 | 4/1982 | Holtkamp | 47/39 |
| 4,344,251 | 4/1982 | Edling | 47/80 |
| 4,369,598 | 1/1983 | Beckwith | 47/66 |
| 4,741,125 | 5/1988 | Demerest | 47/81 |
| 4,782,627 | 11/1988 | Hauk | 47/81 |

FOREIGN PATENT DOCUMENTS

| | | | |
|---|---|---|---|
| 0089763 | 9/1983 | European Pat. Off. | 97/81 |
| 1064281 | 8/1959 | Fed. Rep. of Germany | 47/81 |
| 565048 | 10/1944 | United Kingdom | 47/81 |

Primary Examiner—David A. Scherbel
Assistant Examiner—Jerrold D. Johnson
Attorney, Agent, or Firm—William H. Maxwell

[57] ABSTRACT

A controlled wick waterer for planter pots wherein at least one pair of opposed rails restricts capillary flow through the wick, and improved by at least one rail opposed by a pair of rails with interengagement of the rails for diagonal compression along two lines transversely of the wick, and any multiple of said at least one rail opposed by a pair of rails, carried by a platform over a reservoir within a pot and with manual access and level indicator for filing and pressure for adjustment controlling the rail pressure upon the wick therebetween.

24 Claims, 3 Drawing Sheets

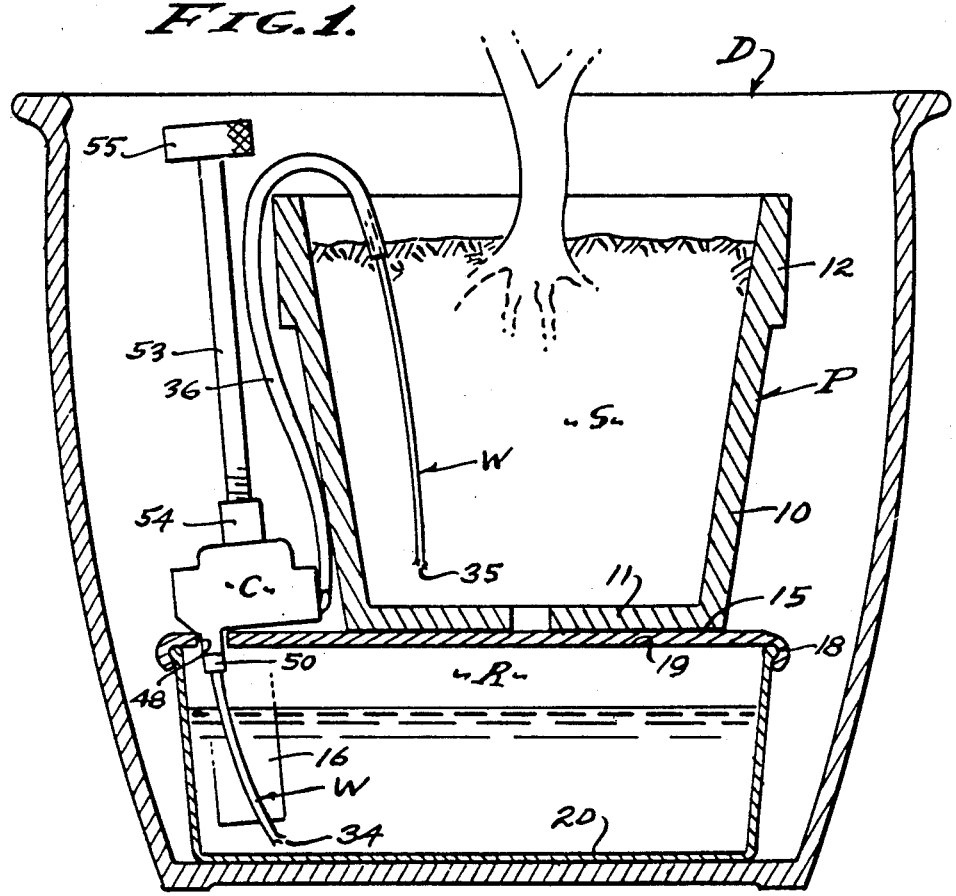
FIG.1.
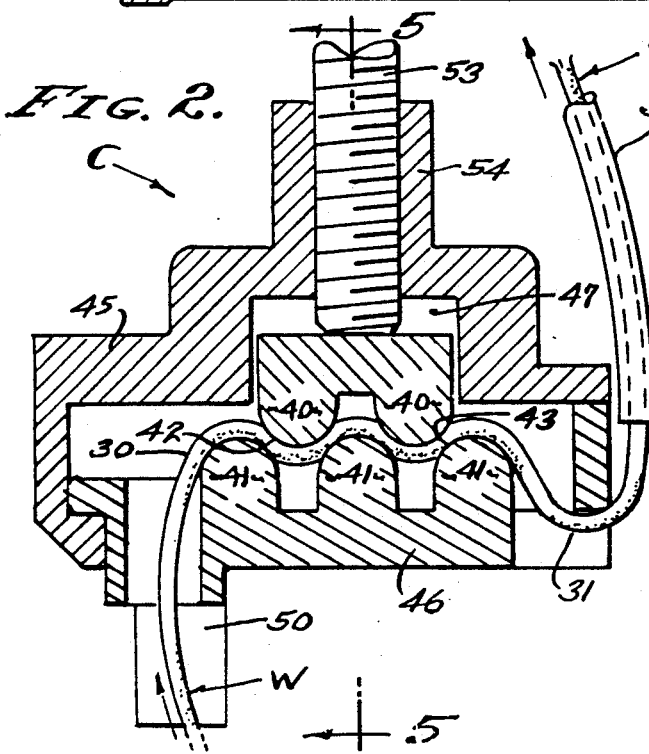
FIG.2.
FIG.3.

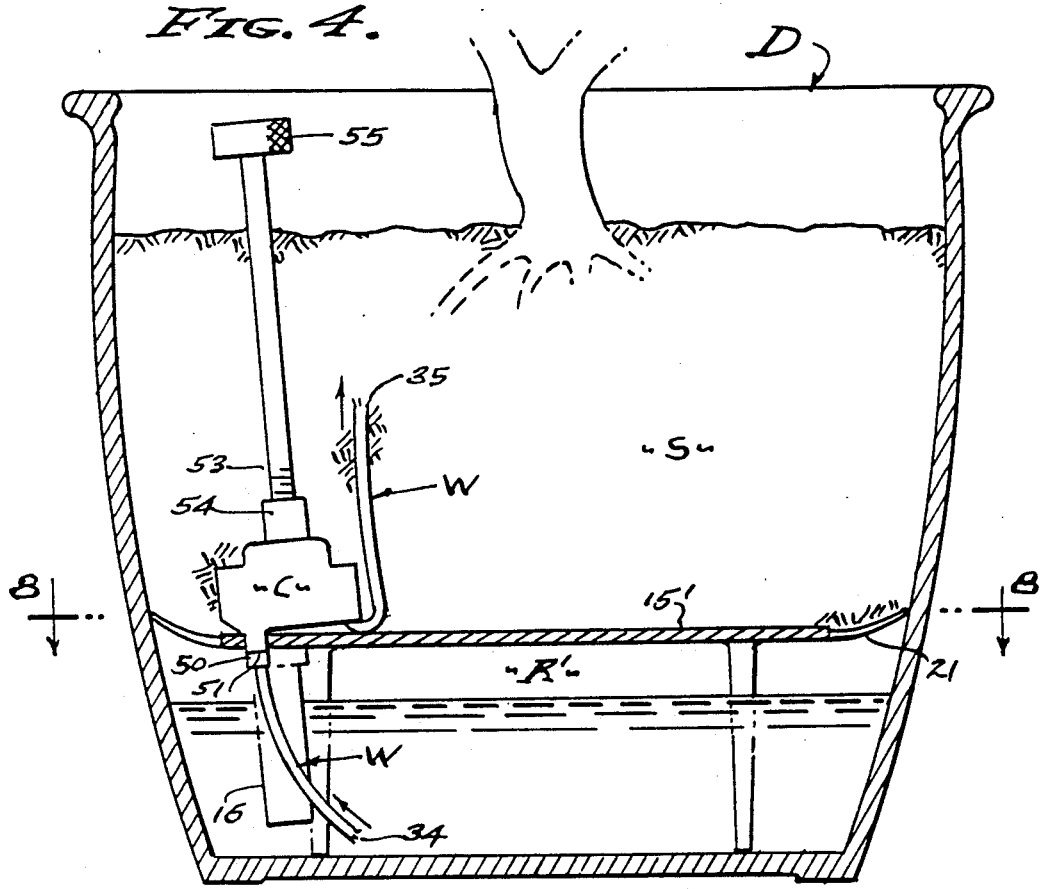
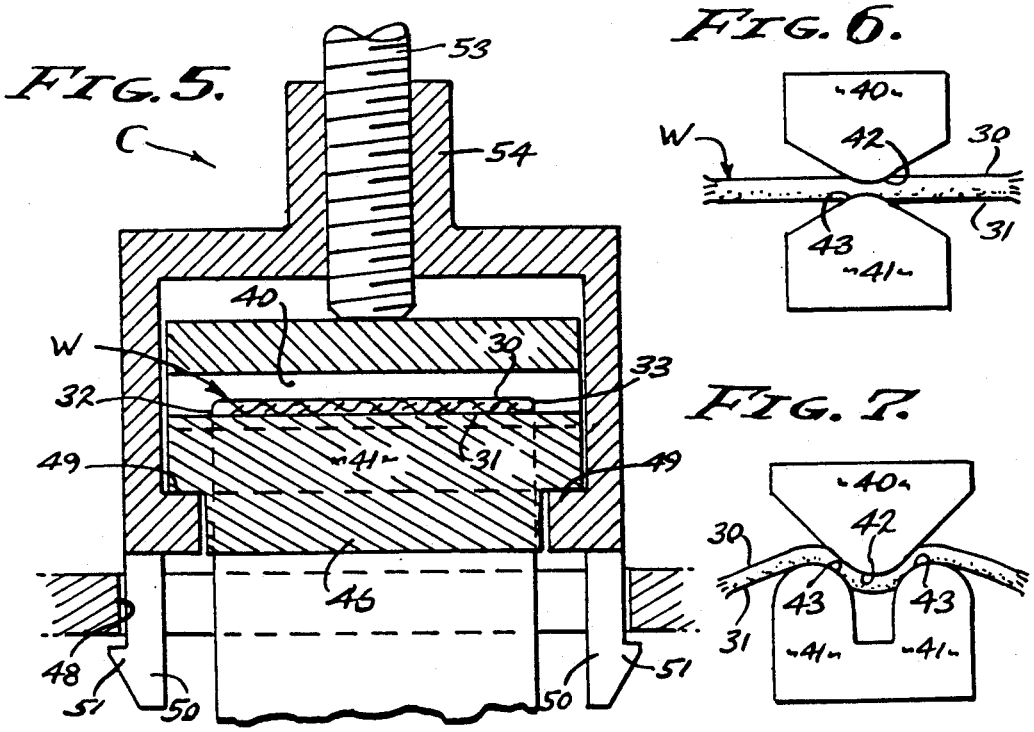

CONTROLLED WICK WATERER FOR PLANTER POTS AND THE LIKE

BACKGROUND OF THE INVENTION

This invention relates to the growing of potted plants and to the watering thereof consistent with the requirement therefor in each particular instance. That is, control over the watering of potted plants is a necessary factor in the plant's continued survival, as over-watering or under-watering can be detrimental. Heretofore, conventional planter pots with drainage holes have been filled with soil, special growing medium or planter mix, and watered at the discretion of the person in charge, but this requires constant attention which is not always possible. Therefore, this art has developed a number of watering systems for the automatic watering of planters and planter pots, among which are wicking systems that continuously supply water to the growing medium, but with inadequate control. Thus, it is a general object of this invention to provide an improved and controlled system for the wick watering of planter pots and the like.

The wick is made of a hydrophilic material having a strong affinity for water, however such materials heretofore employed have been subject to deterioration through the growth of fungus and algae therein, to which biodegradable materials are susceptible. Accordingly, it is an object of this invention to employ non-biodegradable hydrophilic materials that are not susceptible to such biological growths. Thus, the wick employed herein remains intact and clean for the continued capillary function for which it is employed.

The capillary action of wicking has been inadequately controlled in the past, though it has been known that pinching of the wick has a restrictive effect on the flow of water therethrough. For example, in U.S. Pat. No. 4,236,352 issued Dec. 2, 1980 to Heany et al, a capillary sponge is constricted with a loop for flow control, but this does not sufficiently restrict water flow in most instances. Also, the prior art is redundant with wicks controlled by various means other than constriction. Therefore, it is a general object of this invention to control the flow of water through the wick in a plant waterer or the like. Further, it is an object of this invention to provide for the adequate control over the flow of water through the wick. With the present invention, at least one constriction and preferably a multiplicity of successive restrictions is employed in order to obtain substantially complete control over the capillary flow of water through the wick. In practice, this invention provides a series of compression points along the wick, in which each successive point of compression further restricts the water flow of the preceeding restriction. For example, using the wick and compressive restriction as disclosed herein, four points of compression stop or shut off, approximately 97 percent of the free capillary flow through the wick. This efficiency is not possible with a single compression point of restriction as it is applied herein.

It is an object of this invention to provide controlled wicking as hereinabove described in a watering unit adapted to various decorative planters in which planter pots are received and into which the wick is buried for the watering of the growing medium. It is another object to provide flexibility that conforms to the configurations of the various decorative planters surrounding the unit. It is still another object to provide access for adjusting the wick control and to the filler tube for replenishing the water supply as circumstances require, and also to provide a water level indicator.

In a self-contained embodiment of this invention there is a platform to support the planter pot, said platform being carried by a water reservoir and having the wick flow control at one side and articulated for flexible adaptation to the various decorative planter and planter pot configurations. In a second adapter embodiment of this invention, the platform is provided with a constrictable periphery to be fitted into planters and pots of various diameters. The platform in each instance supports the planter pot, the wick flow control and filler tube with the water level indicator.

It is still another object of this invention to provide a wick flow compressor for restricting the flow of water therethrough which comprised of at least one and preferably a series of transverse compression lines for longitudinally successive restriction of water flow, as may be required. With this invention, there is a single compression means that simultaneously forces opposed rails into compressive line engagement on and with the wick therebetween, a feature being the self-alignment of the rails, and characterized by two rails opposed by a single rail so as to establish two lines of compression spaced longitudinally of the wick. In practice, there are three rails at one side of the wick and two rails at the other side of the wick, whereby four distinct lines of compression are provided. However, it is to be understood that any number of lines of compression can be employed as required. For example, at least one or two, or any multiple of two rails utilizing the opposed relationship of two rails opposed by one rail may be used, as herein disclosed.

SUMMARY OF THE INVENTION

A plant waterer is provided wherein wicking is employed for the transport of water from a storage vessel into soil or a growing medium. It is a primary object of this invention to improve and thereby provide adequate control over the flow of water transported by wicking, as prior art wicking lacked the control necessary for maintaining precise soil dampness according to plant requirements. There is a platform for the support of a planter pot containing the soil and a plant therein requiring a particular soil dampness. The platform carries the control or wick flow compressor through which the wick passes from immersion in a water supply as it extends to the planter pot where its end portion is buried a substantial depth in the soil. The platform also carries a water filler tube and water level indicator, both of which extend upward to the height of the planter pot.

The usual planter pot flares upwardly and outwardly, the flow compressor and filler tube being flexible and/or articulated to deflect and/or swing upwardly and outwardly for access at the rim of the planter pot. In a first embodiment the platform is the cover of a water supply vessel into which the supply end of the wick is immersed, and into which the filler tube opens and through which the water level indicator operates. This water supply vessel with the wick flow compressor and filler tube at the periphery thereof is operable per se, or preferably within the confines of a closely surrounding decorative planter pot or jar. In a second embodiment the platform has a depressible perimeter adapted to conform with a range of inner planter pot diameters into which it is forcibly inserted. Otherwise, the second embodiment is the same as the first. This invention is characterized by the wick flow compressor which has at least one and preferably a series of transverse lines of compression so as to efficiently restrict the capillary passage of water through the wick and provide adequate control in transporting water from the supply vessel into the soil and subsequent absorption into the root system of the plant.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a sectional view showing the self-contained wick waterer installed in a decorative planter pot.

FIG. 2 is an enlarged sectional view of the compressor means.

FIG. 3 is a view of the filler tube and water level indicator for the reservoir.

FIG. 4 is a view similar to a portion of FIG. 1 and shows an adapter type waterer installed directly in the decorative planter pot.

FIG. 5 is a sectional view taken as indicated by line 5—5 on FIG. 2.

FIG. 6 is a view similar to a portion of FIG. 2 and shows a pair of opposed compressor rails.

FIG. 7 is a view similar to a portion of FIG. 2 and shows at least one rail opposing a pair of rails.

Figure 8:
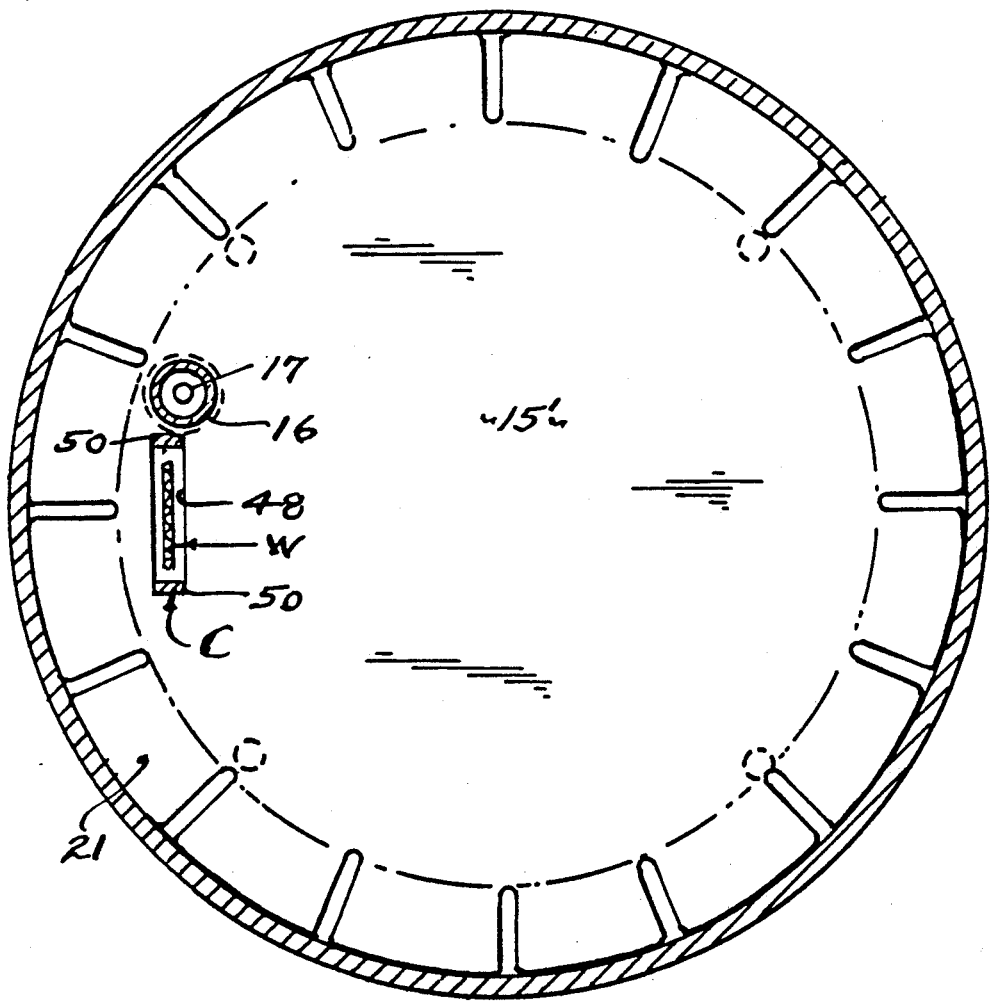

And FIG. 8 is a plan section taken as indicated by line 8—8 on FIG. 4.

PREFERRED EMBODIMENT

Referring now to the drawings, this invention resides primarily in the flow control C that restricts the capillary flow of water through a wick W from a reservoir R and into soil S in which there is a plant. The soil S, or growing medium, and plant root system to be watered are shown herein in a planter pot P. The planter pot P is of the usual round configuration with an outwardly flared side wall 10 extending upwardly from a bottom 11 to a top rim 12 of greater diameter than the bottom. In practice, there is a platform 15 upon which the planter pot P is supported and which carries the flow control C with the wick W extending from the reservoir R into the soil S. The platform 15 also carries a filler tube 16, with which to fill the reservoir and a water level indicator 17 to indicate the water level therein. A feature of the platform 15 is that it is substantially occupied by the planter pot P, and that the flow control C and filler tube 16 with the water level indicator 17 are located at one side thereof for access within a surrounding decorative planter D, as will be described.

In a first embodiment this controlled wick waterer is self-contained, in that it is complete with the reservoir R, the platform 15 being a top closure for the reservoir. Accordingly, the perimeter of the platform 15 is sealed at 18 with the top rim of the reservoir wall 19, the reservoir being closed and supported by a bottom 20. The reservoir R closed by the platform 15 sealed therewith is of a configuration which readily fits into a decorative planter D, or a like pot or jar.

In a second embodiment this controlled wick waterer is adapted to a decorative planter D, or a like pot or jar, by means of a platform 15' having a constrictable perimeter 21, so as to be readily forced into frictional engagement within a pot diameter which may vary. In this second form the surrounding decorative planter D, pot or jar, is relied upon as the reservoir R'.

The filler tube 16 opens through the platform 15 (15') at a peripheral side portion thereof and extends to the approximate height of the planter pot rim 12 where it is open to receive water conducted into the reservoir R (R') thereby.

The level indicator 17 is a rod projecting upwardly from a float 22 supported by the water in the reservoir R (R'), the rod extending through and guided by the tube 16 and with its top end 23 visibly exposed at the top open end of the tube. In practice, the end 23 is exposed at the open end plane of tube 16, thereby indicating a full condition of the reservoir.

In accordance with this invention, I provide the flow control C that restricts the capillary flow of water through the wick W. That is, free capillary flow through the wick is controllably restricted as may be required. As shown, the wick W is a flat, flexible and elongated band of wicking material having top and bottom sides 30 and 31 and parallel edges 32 and 33. The wicking material is a hydrophilic mat of woven polyester which is non-biodegradable and not subject to breakdown by algae or fungus or the like, to which biodegradable materials are subject. In practice, the wick W is 1/16 inch thick, 1 inch wide and is of a length to have its supply end 34 immersed in the water supply of the reservoir R (R') and its delivery end 35 buried in the soil S to be watered, all as shown. In order to protect the wick W and to prevent evaporation of water being transported thereby, a sleeve 36 is applied coextensively over the wick as it extends from the flow control C to the soil level into which the wick penetrates.

The flow control C is characterized by a wick compressor means comprised of opposed rails 40 and 41, an upper rail 40 and a lower rail 41 in spaced parallel relationship disposed transversely of and with the wick W engaged therebetween. A feature is the opposed line engagement of the rails with the wick, this feature being accomplished by the convex cross-sectional configuration of the rails which thereby have tangential engagement with the wick at both the top and bottom sides 30 and 31 respectively. A small radius of convexity has been discovered to be most effective, and in practice a radius of ⅛ inch has been found to be most practical. Therefore, when the rails 40 and 41 are brought into opposed engagement with the sides 30 and 31 of the wick, the opposed convex faces 42 and 43 thereof press coextensively between the sides 32 and 33 to create a flow restriction in the wick W commensurate with pressure applied to the wick as will be described. Flow restriction in the wick W is the result of compression that reduces the capillary channels that inherently tend to transport the water, increased pressure producing greater restriction and vice versa.

The wick compressor means in its improved form is comprised of at least two rails opposed by a single rail, in order to establish two lines of compression, thereby increasing the resolution of control twofold. In order to further increase the resolution of control there is a second set of two rails opposed by a single rail establishing two additional lines of compression, thereby increasing the resolution of control to a total of fourfold. An unobvious feature is that each pair of two lines of compression involves a common rail, a center rail, and accordingly there are three bottom rails 41 opposed by two top rails 40. In practice, the rails 40 and 41 are spaced ⅛ inch apart, the rails 40 being centered over the voids between rails 41, as shown. The spacing of the rails 40 and 41 is less than the thickness thereof which is ¼ inch, proportioned as is clearly indicated, whereby there is an interengagement of the rails which establishes two lines of wick compression when employing the two rails 41 opposed by the one rail 40. In practice, the rail 40 enters partly between the spaced rails 41 so that there are two tangential lines of wick compression on the convex face of rail 40, while there is a single line of wick compression on the convex face of each rail 41, a feature being the divergent angular direction of force applied by rail 40 upon the rails 41. Thus, there are four distinct lines of wick compression when employing three rails 41 opposed by two rails 40. However, it is to be understood that there can be additional sets of rails, as described, to achieve even greater control resolution. As is shown, the wick W is warped through and between the rails in a serpentine fashion to be engaged by the four lines of compression.

The flow control C is shown comprised of a frame 45 carried by the platform 15 (15') and adapted to receive and carry a slide 46. The slide 46 incorporates the rails 41, and the frame provides a seat 47 of recessed configuration that locates the rails 40 in opposition to the rails 41. The frame 45 is horizontally disposed over an opening 48 through the platform, for passage of the supply end portion 34 of the wick W from one end of the frame and into the reservoir R (R'), while the wick issues from the other end of the frame to extend upwardly and over the rim 12 of the planter pot P. The frame 45 has guides 49 to capture the slide 46 when moved horizontally into working position for installation of the wick W, where it backs up the force of compression that is applied for flow control through the wick. A feature of frame 45 is its articulated mounting to the platform 15 (15') by a pair of spaced hinge legs 50 with detents or hooks 51 snapped through a loosely fitted opening 48 through the platform. Thus, the flow control C and its compression means next described is flexibly mounted so as to be movable away from the flared side of the planter pot P.

Adjustment of the flow control C is by a pressure means that regulates the capillary flow of water through the wick W. The form of pressure means can vary and is shown herein as a simple screw 53 threaded through a head portion 54 of the frame 45 and on a vertical axis to press downwardly against the pair of integral rails 40. The screw 53 has a stem that extends upward to the rim of the planter pot P where it is accessible and adjustably turned by a knob 55. A feature is the loose postioning of the rail or rails 40 as a unit within the seat 47, so that the rails 40 and 41 seek interengagement and positions of equilibrium at all lines of compression with the wick W.

The self-contained embodiment is put into operation by filling the reservoir R with water as indicated by the level indicator 17, whereupon the knob 55 of the pressure means is adjusted as circumstances require. The constrictable second embodiment is put into operation by forcing the deformable periphery of platform 15' into a planter containing water, the reservoir R', said perimeter or periphery being flexible and formed as such by providing a multiplicity of radial slits opening at the outer diameter thereof.

From the foregoing it will be understood how precise adjustment of capillary water flow is achieved with this improved flow control C, associated as hereinabove described with respect to the platform 15 (15') and reservoir R (R') and for adaptation to planter pots P and decorative planters D of varied form and configuration. It is the successive lines of compression along the wick W which resolves flow control to a precise degree of regulation, and all of which is accessible.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A controlled wick waterer for planters and having a flow control regulating capillary transport thereof through the wick, and including:
   a wick having a supply portion to be immersed in a water reservoir, an intermediate portion, and a delivery portion to be buried in soil within the planter,
   a wick compressor means comprised of opposed rails in spaced parallel relationship disposed transversely of and each in tangential line contact with the intermediate portion of the wick extending therebetween,
   and a pressure means to force the rails into opposed compressive engagement into the wick thereby restricting capillary flow therethrough.

2. The controlled wick waterer and flow control as set forth in claim 1, wherein the wick is a flexible elongated band of hydrophilic material having top and bottom sides over which the opposed rails are coextensive.

3. The controlled wick waterer and flow control as set forth in claim 1, wherein the pressure means is a screw means adjustably engageable with one of said rails, the other of said rails being supported by a frame carrying the screw means.

4. The controlled wick waterer and flow control as set forth in claim 3, wherein the wick compressor means is carried by a frame at a side of a platform supporting a planter pot over the water reservoir, the screw means of the pressure means being carried by the frame and the frame being hinged to swing the pressure means upwardly and away from the planter pot, with the supply portion of the wick immersed in the water, and with the delivery portion of the wick extending to an over a rim of the planter pot and buried in the soil.

5. The controlled wick waterer and flow control as set forth in claim 1, wherein the rails are convexly faced for tangential engagement into the wick.

6. The controlled wick waterer and flow control as set forth in claim 1, wherein one of said rails is carried by a frame and the other of said rails is carried by a slide moveable in the frame, and wherein the pressure means is a screw means adjustably engaged with the slide to force the rails into engagement with the wick compressed therebetween.

7. The controlled wick waterer and flow control as set forth in claim 1, wherein the wick is a flexible elongated band of hydrophilic material having top and bottom sides over which the opposed rails are coextensive, wherein the rails are convexly faced for tangential engagement into the wick, wherein one of said rails is carried by a slide moveable in the frame, and wherein the pressure means is a screw means adjustably engaged with the slide to force the rails into engagement with the wick compressed therebetween.

8. The controlled wick waterer and flow control as set forth in claim 1, wherein the wick compressor means is carried at a side of a platform supporting a planter pot over the water reservoir, with the supply portion of the wick immersed in the water, and with the delivery portion of the wick extending to and over a rim of the planter pot and buried in the soil.

9. The controlled wick waterer and flow control as set forth in claim 1, wherein the wick compressor means is carried at a side of a platform having a constrictable perimeter forced into a surrounding planter for support and supporting a planter pot over the water reservoir, with the supply portion of the wick immersed in the water, and with the delivery portion of the wick extending to and over a rim of the planter pot and buried in the soil.

10. The controlled wick waterer and flow control as set forth in claim 1, wherein the wick compressor means is carried at a side of a platform sealed with the reservoir as a top thereof and supporting a planter pot over the water reservoir, with the supply portion of the wick immersed in the water, and with the delivery portion of the wick extending to and over a rim of the planter pot and buried in the soil.

11. A controlled wick waterer for planters and having an improved flow control regulating capillary water transport through the wick, and including:
   a wick having a supply end portion to be immersed in a water reservoir, an intermediate portion, and a delivery portion to be buried in soil within the planter,
   a wick compressor means comprised of at least one rail opposed by a pair of rails in spaced parallel relationship disposed transversely of and each in tangential line contact with the intermediate portion of the wick in line contact tangential extending therebetween,
   and a pressure means forcing said at least one rail into engagement with said pair of spaced rails and with the wick compressed therebetween and thereby successively restricting control of capillary flow therethrough at spaced intervals along the wick.

12. The controlled wick waterer and improved flow control as set forth in claim 11, wherein the wick is a flexible elongated band of hydrophilic material having top and bottom sides over which the opposed rails are coextensive.

13. The controlled wick waterer and improved flow control as set forth in claim 11, wherein the pressure means is a screw means adjustably engageable with at least one of said rails and carried by a frame supporting the other of said rails opposed thereto.

14. The controlled wick waterer and improved flow control as set forth in claim 11, wherein the pressure means is a screw means adjustably engageable with the at least one rail, the opposed pair of spaced rails being supported by a frame carrying the screw means.

15. The controlled wick waterer and improved flow control as set forth in claim 11, wherein the rails are convexly faced for tangential engagement into the wick.

16. The controlled wick waterer and improved flow control as set forth in claim 11, wherein said pair of spaced rails is carried by a frame and the at least one rail is carried by a slide moveable in the frame, and wherein the pressure means is a screw means adjustably engageable with the slide to force the at least one rail into engagement with the wick compressed against said pair of spaced rails.

17. The controlled wick waterer and improved flow control as set forth in claim 11, wherein the wick is a flexible elongated band of hydrophilic material having top and bottom sides over which the opposed rails are coextensive, wherein the rails are convexly faced for tangential engagement into the wick, wherein said pair of spaced rails is carried by a frame and the at least one rail is carried by a slide moveable in the frame, and wherein the pressure means is a screw means adjustably engageable with the slide to force the at least one rail into engagement with the wick compressed against said pair of spaced rails.

18. A controlled wick waterer for planters and having an improved flow control regulating capillary water transport through the wick, and including:
   a wick having a supply end portion to be immersed in a water reservoir, an intermediate portion, and a delivery portion to be buried in soil within the planter,
   a wick compressor means comprised of at least two successive sets of one rail opposed by a pair of rails in spaced parallel relationship disposed transversely of and with the intermediate portion of the wick extending therebetween, one rail of each of said pair of rails of each set being common with the other,
   and a pressure means forcing said at least one rail of each set into engagement with said pair of said spaced rails and with the wick compressed successively between each set of rails restricting control of capillary flow therethrough at spaced intervals along the wick.

19. The controlled wick waterer and improved flow control as set forth in claim 18, wherein the wick is a flexible elongated band of hydrophilic material having top and bottom sides over which the opposed rails are coextensive.

20. The controlled wick waterer and improved flow control as set forth in claim 18, wherein the pressure means is a screw means adjustably engageable with at least one of said rails of each set and carried by a frame supporting the other of said rails opposed thereto.

21. The controlled wick waterer and improved flow control as set forth in claim 18, wherein the pressure means is a screw means adjustably engageable with the at least one rail of each set, the opposed pairs of spaced rails of each set including the said common rail being supported by a frame carrying the screw means.

22. The controlled wick waterer and improved flow control as set forth in claim 18, wherein the rails are convexly faced for tangential engagement into the wick.

23. The controlled wick waterer and improved flow control as set forth in claim 18, wherein said pairs of spaced rails of each set including said common rail are carried by a frame and the at least one rail of each set is carried by a slide moveable in the frame, and wherein the pressure means is a screw means adjustably engageable with the slide to force the at least one rail of each set into engagement with the wick compressed against said pairs of spaced rails of each set including said common rail thereof.

24. The controlled wick waterer and improved flow control as set forth in claim 18, wherein the wick is a flexible elongated band of hydrophilic material having top and bottom sides over which the opposed rails are coextensive, wherein the rails are convexly faced for tangential engagement into the wick, wherein said pairs of spaced rails of each set including said common rail are carried by a frame and the at least one rail of each set is carried by a slide moveable in the frame, and wherein the pressure means is a screw means adjustably engageable with the slide to force the at least one rail of each set into engagement with the wick compressed against said pairs of spaced rails of each set including said common rail thereof.

* * * * *